United States Patent [19]

Licht et al.

[11] Patent Number: 5,756,170

[45] Date of Patent: May 26, 1998

[54] PACKAGING FILMS COATED WITH POLYURETHANE

[75] Inventors: Ulrike Licht, Mannheim; Hermann Seyffer, Heidelberg; Jens Rieger, Ludwigshafen; Helmut Kaehs, Niederkirchen; Rainer Hummerich, Worms, all of Germany

[73] Assignee: BASF Aktiengesellschaft, Ludwigshafen, Germany

[21] Appl. No.: 632,151

[22] Filed: Apr. 15, 1996

[30] Foreign Application Priority Data

Apr. 20, 1995 [DE] Germany ............. 195 14 583.6

[51] Int. Cl.⁶ .................................. B29D 22/00
[52] U.S. Cl. .................. 428/35.7; 428/423.1; 428/346
[58] Field of Search ................. 428/423.1, 35.7, 428/346

[56] References Cited

U.S. PATENT DOCUMENTS

| | | | |
|---|---|---|---|
| 3,935,367 | 1/1976 | Merrill et al. | 428/336 |
| 4,291,085 | 9/1981 | Ito et al. | 428/215 |
| 4,980,108 | 12/1990 | Suzuki et al. | 264/134 |
| 5,055,516 | 10/1991 | Fisch et al. | |
| 5,385,967 | 1/1995 | Bauer et al. | 524/458 |

FOREIGN PATENT DOCUMENTS

| | | |
|---|---|---|
| 0 155 595 | 9/1985 | European Pat. Off. |
| 0 240 886 | 10/1987 | European Pat. Off. |
| 0 382 052 | 8/1990 | European Pat. Off. |
| 0 574 803 | 12/1993 | European Pat. Off. |
| WO 90/06330 | 6/1990 | WIPO . |
| WO 94/25270 | 11/1994 | WIPO . |

*Primary Examiner*—E. Rollins Buffalow
*Attorney, Agent, or Firm*—Oblon, Spivak, McClelland, Maier & Neustadt, P.C.

[57] ABSTRACT

Packaging films are coated with a polyurethane which bears hydrophilic groups which make the polyurethane water-dispersible and which has a melting point of from 20° to 70° C., with the enthalpy of fusion in this temperature range being at least 20 J/g.

6 Claims, No Drawings

PACKAGING FILMS COATED WITH POLYURETHANE

The present invention relates to packaging films coated with a polyurethane which bears hydrophilic groups which make the polyurethane water-dispersible and which has a melting point of from 20° to 70° C., with its enthalpy of fusion in this temperature range being at least 20 J/g. The invention further relates to packaging methods and articles which are packed using the packaging films.

Foodstuffs and drugs, cosmetics and other sensitive, perishable or valuable goods are frequently packed in packaging films such as paper, metal or plastic films. These articles are advantageously sealed into the film so that they are tightly enclosed by the packaging film. This protects the articles from damage caused by mechanical means (eg. scratching), action of air and moisture, drying out or accumulating dust. In addition, intact packaging provides the consumer with a guarantee that the article is still in a hygienically unimpaired state.

In the sealing process, a bond is formed between the inside of the packaging film, ie. the side facing the goods being packed, and another part of the packaging film, namely with the inside of this other part of the film if the packaging film is folded around the article, or with the outside of the packaging film if it is rolled around the article.

It is generally known (cf. EP-A-0574803) that packaging films can be sealed more easily if they are coated over their area with a sealing varnish. To seal the packaging films, they are, in the hot sealing process, pressed together with heated sealing jaws for a few seconds or fractions of a second at about 100° C. In this process, the coating is melted and brought into contact with the part of the film to be adhesively bonded, so that cooling and solidification of the coating results in a strong bond.

However, the hot sealing process has the problem that when packing temperature-sensitive articles, eg. icecream, chocolate bars or chocolates, the sealing has to be carried out at a certain distance from the article so that it is not damaged by the heat from the sealing jaws. This causes an increased consumption of packaging material and there is therefore a desire for sealing varnishes which can be readily sealed at a considerably lower temperature.

Apart from the low sealing temperature, other demands are made of the use properties of a sealing varnish. Usually, the production of the coated packaging film and the packaging process itself are not carried out at one place in two steps directly after one another. For this reason, after the films are coated they generally have to be rolled up and transported. During this process, the films must not adhere strongly to one another, ie. they should have a good blocking resistance.

The mixtures of copolymers having different glass transition temperatures described in EP-A-0 574 803 are already a compromise in respect of these two diverging use properties, since the films coated with them do not yet block at 40° C. and are still readily sealable at 80° C.

Furthermore, Verpackungs-Rundschau, Issue 6 from 1989, pp. 649–654, discloses the use of aqueous polyvinylidene chloride (PVDC) dispersions for this application. These have good blocking behavior, but high sealing temperatures are required. On the part of the packaging industry, there is therefore still a need for sealing varnishes for which the temperature gap between blocking and sealing temperature is still smaller.

EP-A-0 382 052 discloses aqueous dispersions which are obtained by dispersing a solution comprising a polyurethane having hydrophilic groups, a condensation resin and acetone, in water. Reworking Example 1 showed that dried films of polyurethane dispersions have a melting point of 50° C., with the enthalpy of fusion being 30 J/g. It is recommended that these dispersions be used for adhesive bonding of substances such as wood, metal and plastics. There is no reference to the use of the dispersions for bonding films and the problems associated therewith.

It is an object of the present invention to provide coated packaging films by means of which temperature-sensitive articles can be sealed in in an economical manner. In particular, the temperature at which the packaging films can be sealed should be only slightly above room temperature or at room temperature. Furthermore, the packaging films should be able to be processed and transported in a conventional manner in the form of rolls without them blocking.

We have found that this object is achieved by means of the coated packaging films defined in the introduction.

Suitable support films for producing the coated packaging films of the present invention are those customarily used in the packaging industry, ie. support films of materials such as polymers, eg. polyolefin, in particular polyethylene and polypropylene, polyester, polyamide, reconstituted cellulose film, polyacrylonitrile, polyvinyl chloride, aluminum and also paper and cardboard. Support films made up of a plurality of layers consisting of the various materials mentioned are also suitable. Particular preference is given to films of oriented polypropylene.

Support films which are used as packaging usually have a thickness of from 10 to 500 μm. To improve the adhesion of the polyurethane to the support film, they are advantageously coated with a primer. Suitable primers are commercial 2-component polyurethane primers.

The packaging films are preferably coated over the full area of one side with a polyurethane which bears hydrophilic groups which make the polyurethane water-dispersible, and which has a melting point of from 20° to 70° C., preferably from 25° to 60° C., with the enthalpy of fusion in this temperature range being at least 20 J/g. In principle, the enthalpy of fusion above 20 J/g should be as large as possible, with it being known that the values of this material property for polyurethane are of course limited. Particularly good results are obtained using polyurethanes having an enthalpy of fusion of from 40 to 70 J/g in the defined temperature range.

The thickness of the polyurethane film with which the packaging films are coated is advantageously from 0.5 to 10 μm, preferably from 1 to 5 μm.

The packaging films are generally coated by applying the polyurethane in the form of a solution or an aqueous dispersion, preferably as a solvent-free aqueous dispersion, to the packaging film. The application can be carried out by the generally customary application methods (cf. "Veredeln von Kunststoff-Oberflächen", Editor: Klaus Stoeckhert, Author: E. Lendle, Carl Hanser Verlag München, Berlin, p. 156 and "Handbuch der Papier- und Pappenfabrikation", Dr. Martin Sändig, OHG, Wiesbaden 1971, pp. 1027 and 1826–1830, ie. for example by painting, blade coating or spraying).

If support films in the form of strips are used, the polymer dispersion is usually applied from a pan via an application roller and leveled by means of an air brush. The reverse gravure process is also suitable for applying the coating to the support film. To improve the adhesion of the coating to the support film, the support film is advantageously subjected to corona treatment before coating is carried out. The polyurethane solution or dispersion is preferably applied in amounts of from 1 to 30 g/m² (generally from 2 to 7 g/m² in the case of polymer films and from 10 to 30 g/m² in the case of paper).

After drying of the solvent- or water-containing polyurethane film, the coated packaging film is advantageously rolled up. If drying is carried out at temperatures above the melting point of the polyurethane, with the coated support film being passed, for example, through a drying channel which can be fitted with infrared heating, it is necessary to cool the coated packaging film to temperatures below the melting point of the polyurethane prior to rolling up, or to roll up the film together with release paper, since otherwise there is a danger of the packaging film blocking.

Particularly suitable coating compositions for producing the packaging films are aqueous dispersions comprising a polyurethane which is prepared from a) polyfunctional isocyanates having from 4 to 30 carbon atoms, b) diols of which
  b1) from 10 to 100 mol %, based on the total amount of the diols (b), have a molecular weight of from 500 to 5000, where at least 80% by weight of the diols (b1) are diols (b1.1) having a melting point of from 30° to 100° C. and an enthalpy of fusion in this temperature range of at least 50 J/g and
  b2) from 0 to 90 mol %, based on the total amount of diols (b), have a molecular weight of from 60 to 500 g/mol, c) if desired, further polyfunctional compounds which are different from the diols (b) and contain reactive groups which are alcoholic hydroxyl groups or primary or secondary amino groups, and d) monomers which are different from the monomers (a), (b) and (c) and contain at least one isocyanate group or at least one group which is reactive toward isocyanate groups, and which also bear at least one (potentially) hydrophilic group, which makes the polyurethane water-dispersible.

Suitable monomers (a) are the polyisocyanates customarily used in polyurethane chemistry.

Particular mention shall be made of diisocyanates X(NCO)₂, where X is an aliphatic hydrocarbon radical having from 4 to 12 carbon atoms, a cycloaliphatic or aromatic hydrocarbon radical having from 6 to 15 carbon atoms or an araliphatic hydrocarbon radical having from 7 to 15 carbon atoms. Examples of such diisocyanates are tetramethylene diisocyanate, hexamethylene diisocyanate, dodecameth-ylene diisocyanate, 1,4-diisocyanatocyclohexane, 1-isocyan-ato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4-diisocyanatodiphenylmethane, p-xylylene diisocyanate, the isomers of bis(4-isocyanatocyclohexyl)methane such as the trans/trans, cis/cis and cis/trans isomers and also mixtures of these compounds.

As mixtures of these isocyanates, the mixtures of the respective structural isomers of diisocyanatotoluene and diisocyanatodiphenylmethane are of particular importance, especially the mixture of 20 mol % of 2,4-diisocyanatotoluene and 80 mol % of 2,6-diisocyanatotoluene. Furthermore, the mixtures of aromatic isocyanates such as 2,4-diisocyanatotoluene and/or 2,6-diisocyanatotoluene with aliphatic or cycloaliphatic isocyanates such as hexamethylene diisocyanate or IPDI are particularly advantageous, with the preferred mixing ratio of the aliphatic to aromatic isocyanates being from 4:1 to 1:4.

As compounds (a), use can also be made of isocyanates which bear not only free isocyanate groups but further blocked isocyanate groups, eg. uretdione or urethane groups.

If desired, it is also possible to concomitantly use isocyanates which bear only one isocyanate group. In general, their proportion is at most 10 mol %, based on the total molar amount of monomers. The monoisocyanates usually bear further functional groups such as olefinic groups or carbonyl groups and serve to introduce functional groups into the polyurethane so as to make possible the dispersion or crosslinking or further polymer-analogous reaction of the polyurethane. An example of a suitable monomer for this purpose is isopropenyl-α,α-dimethylbenzyl isocyanate (TMI).

So as to produce polyurethane having a certain degree of branching or crosslinking, it is possible to use, for example, trifunctional and tetrafunctional isocyanates. Such isocyanates are obtained, for example, by reacting difunctional isocyanates with one another, by converting part of their isocyanate groups into allophanate or isocyanurate groups. Commercial compounds are, for example, the isocyanurate of hexamethylene diisocyanate.

Suitable diols (b) for obtaining good film forming properties and elasticity are especially relatively high molecular weight diols (b1) having a molecular weight of from about 500 to 5000 g/mol, preferably from about 100 to 3000 g/mol.

The diols (b1) are particularly polyester polyols which are known, for example, from Ullmanns Encyklopädie der technischen Chemie, 4th edition, Volume 19, pp. 62–65. Preference is given to using polyester polyols which are obtained by reacting dihydric alcohols with dibasic carboxylic acids. In place of the free polycarboxylic acids, it is also possible to use the corresponding polycarboxylic anhydrides or corresponding polycarboxylic esters of lower alcohols or their mixtures for preparing the polyester polyols. The polycarboxylic acids can be aliphatic, cycloali-phatic, araliphatic, aromatic or heterocyclic and may, if desired, be substituted, eg. by halogen atoms, and/or unsaturated. Examples which illustrate the invention are: suberic acid, azel-aic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preference is given to dicarboxylic acids of the general formula HOOC—$(CH_2)_y$—COOH, where y is a number from 1 to 20, preferably an even number from 2 to 20, eg. succinic acid, adipic acid, dodecanedioic acid and sebacic acid.

Suitable polyhydric alcohols are, for example, ethylene glycol, 1,2-propanediol, 1,3-propanediol, 1,3-butanediol, butene-1,4-diol, butyne-1,4-diol, 1,5-pentanediol, neopentyl glycol, bis(hydroxymethyl)cyclohexanes such as 1,4-bis (hydroxymethyl)cyclohexane, 2-methylpropane-1,3-diol, also diethylene glycol, triethylene glycol, tetraethylene glycol, polyethylene glycol, dipropylene glycol, polypropylene glycol, dibutylene glycol and polybutylene glycol. Preference is given to alcohols of the general formula HO—$(CH_2)_x$—OH, where x is a number from 1 to 20, preferably an even number from 2 to 20. Examples are ethylene glycol, 1,4-butanediol, 1,6-hexanediol, 1,8-octanediol and 1,12-dodecanediol.

Other suitable diols are polycarbonate diols as can be obtained, for example, by reacting phosgene with an excess of the low molecular weight alcohols mentioned as formative components for the polyester polyols.

Also suitable are polyester diols based on lactones, namely homopolymers or copolymers of lactones, preferably addition products having terminal hydroxyl groups obtained by molecular addition of lactones to suitable difunctional initiator molecules. Preferred lactones are those of the general formula HO—$(CH_2)_z$—COOH, where z is a number from 1 to 20, preferably an odd number from 3 to 19, eg. epsilon-caprolactone, β-propiolactone, gamma-butyrolactone and/or methyl-epsilon-caprolactone and mixtures of these. Suitable initiator components are, for example, the low molecular weight dihydric alcohols mentioned above as formative components for the polyester polyols. The corresponding polymers of epsilon-caprolactone are particularly preferred. It is also possible to use lower polyester diols or polyether diols as initiators for preparing the lactone polymers. In place of the polymers of lactones, it is also possible to use the corresponding, chemically equivalent polycondensates of the hydroxycarboxylic acids corresponding to the lactones.

Other suitable monomers (b1) are polyether diols. They are obtainable, in particular, by polymerization of ethylene oxide, propylene oxide, butylene oxide, tetrahydrofuran, styrene oxide or epichlorohydrin with itself, eg. in the presence of $BF_3$, or by molecular addition of these compounds, if desired in admixture or successively, to initiator components containing reactive hydrogen atoms, for example alcohols or amines, such as water, ethylene glycol, 1,2-propanediol, 1,3-propanediol, 1,2-bis(4-hydroxyphenyl)propane or aniline. Particular preference is given to polytetrahydrofuran and a molecular weight of from 2000 to 5000, especially from 3500 to 4500.

The polyester diols and polyether diols can also be used as mixtures in a ratio of from 0.1:1 to 1:9.

For example, polyurethane having the defined melting point and the defined enthalpy of fusion are obtained if at least 80% by weight, preferably 90% by weight, of the diols (b1) are those diols (diols b1.1) which have a melting point of from 20° to 70° C., preferably from 30° to 100° C., and an enthalpy of fusion in this temperature range of at least 50 J/g, preferably from 60 to 100 J/g, particularly preferably from 80 to 100 J/g. The proportion of the diols (b1.1) is very particularly preferably 100% by weight.

Among the diols (b1) already mentioned, the following compounds have the desired melting point and enthalpy of fusion: polyester diols derived from an alcohol HO—$(CH_2)_x$—OH, where x is a number from 1 to 20, preferably an even number from 2 to 20, and a dicarboxylic acid HOOC—$(CH_2)_y$—COOH, where y is a number from 1 to 20, preferably an even number from 2 to 20.

Also suitable are polyester diols based on lactones of the general formula HO—$(CH_2)_z$—COOH, where z is a number from 1 to 20, preferably an odd number from 3 to 19, eg. epsilon-caprolactone, β-propiolactone and gamma-butyrolactone.

Another suitable diol is polytetrahydrofuran having a molecular weight of from 2000 to 5000 and especially from 3500 to 4500. Which further diols (b1) are suitable as diols (b1.1) can be determined by simple preliminary experiments using the DSC method (differential scanning calorimetry).

The hardness and the modulus of elasticity of the polyurethanes can be increased by using as diols (b) not only the diols (b1) but also low molecular weight diols (b2) having a molecular weight of from about 50 to 500 g/mol, preferably from 60 to 200 g/mol.

Monomers (b2) used are especially the short-chain alkanediols mentioned as formative components for the preparation of polyester polyols, where the unbranched diols having from 2 to 12 carbon atoms and an even number of carbon atoms being preferred.

The proportion of the diols (b1), based on the total amount of the diols (b), is preferably from 10 to 100 mol % and the proportion of the monomers (b2), based on the total amount of the diols (b), is from 0 to 90 mol %. The ratio of the diols (b1) to the monomers (b2) is preferably from 0.2:1 to 5:1, particularly preferably from 0.5:1 to 2:1.

The monomers (c), which are different from the diols (b), generally serve as crosslinkers or chain extenders. They are generally more than dihydric non-aromatic alcohols, amines having 2 or more primary and/or secondary amino groups and compounds which bear one or more primary and/or secondary amino groups in addition to one or more alcoholic hydroxyl groups.

Examples of alcohols having a higher functionality than 2, which can serve to establish a certain degree of branching or crosslinking, are trimethylolpropane, glycerol or sugar.

Further suitable monomers (c) are monoalcohols bearing a further group reactive toward isocyanates in addition to the hydroxyl group, for example monoalcohols having one or more primary and/or secondary amino groups, eg. monoethanolamine.

Polyamines having 2 or more primary and/or secondary amino groups are used especially when the chain extension or crosslinking is to take place in the presence of water, since amines generally react more rapidly than alcohols or water with isocyanates. This is frequently necessary when aqueous dispersions of crosslinked polyurethanes or polyurethanes having a high molecular weight are desired. In such cases, prepolymers containing isocyanate groups are prepared, these are quickly dispersed in water and subsequently chain-extended or crosslinked by addition of compounds containing a plurality of amino groups reactive toward isocyanates.

Amines suitable for this purpose are generally polyfunctional amines having a molecular weight in the range from 32 to 500 g/mol, preferably from 60 to 300 g/mol, which contain at least two primary, two secondary or one primary and one secondary amino group. Examples are diamines such as diaminoethane, diaminopropane, diaminobutane, diaminohexane, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be used in blocked form, eg. in the form of the corresponding ketimines (see, for example, CA-1 129 128), ketazines (see, for example, U.S. Pat. No. 4,269,748) or amine salts (see U.S. Pat. No. 4,292,226). Oxazolidines too, as are used, for example, in U.S. Pat. No. 4,192,937, are blocked polyamines which can be used in the preparation of the polyurethanes of the present invention for chain-extending the prepolymers. When using such blocked polyamines, these are generally mixed with the prepolymers in the absence of water and this mixture is subsequently mixed with the dispersion water or a part of the dispersion water, so that the corresponding polyamines are set free by hydrolysis.

Preference is given to using mixtures of diamines and triamines, particularly preferably mixtures of isophoronediamine and diethylenetriamine.

The polyurethanes preferably contain no polyamine or from 1 to 10 mol %, particularly preferably from 4 to 8 mol %, based on the total amount of the components (b) and (c), of a polyamine containing at least 2 amino groups reactive toward isocyanates, as monomer (c).

In addition, for chain termination, it is possible to use subordinate amounts, ie. preferably amounts of less than 10 mol % based on the components (b) and (c), of monoalcohols. Their function is generally similar to that of the monoisocyanates, ie. they serve mainly to functionalize the polyurethanes. Examples are esters of acrylic acid or methacrylic acid such as hydroxyethyl acrylate or hydroxyethyl methacrylate.

To achieve the water-dispersibility of the polyurethanes, the polyurethanes are prepared not only from the components (a), (b) and (c) but also of monomers (d) which are different from the components (a), (b) and (c) and which bear at least one isocyanate group or at least one group reactive towards isocyanate groups and in addition at least one hydrophilic group or a group which can be converted into a hydrophilic group. In the following text, the term "hydrophilic groups or potentially hydrophilic groups" is abbreviated to "(potentially) hydrophilic groups". The (potentially) hydrophilic groups react with isocyanates significantly more slowly than the functional groups of the monomers which serve to make up the main polymer chain.

The amount of the components containing (potentially) hydrophilic groups as a proportion of the total amount of the components (a), (b), (c) and (d) is generally made such that the molar amount of the (potentially) hydrophilic groups, based on the total weight of all monomers (a) to (d), is from 30 to 1000 mmol/kg, preferably from 50 to 500 mmol/kg and particularly preferably from 80 to 300 mmol/kg.

[lacuna] composed of [lacuna] bear [lacuna]. The (potentially) hydrophilic groups can be nonionic or preferably (potentially) ionic hydrophilic groups.

Suitable nonionic hydrophilic groups are, in particular, polyethylene glycol ethers comprising advantageously from 5 to 100, preferably from 10 to 80, ethylene oxide repeating units. The content of polyethylene oxide units is generally from 0 to 10% by weight, preferably from 0 to 6% by weight, based on the weight of all monomers (a) to (d).

Preferred monomers containing nonionic hydrophilic groups are polyethylene glycol and diisocyanates bearing a terminally etherified polyethylene glycol radical. Such diisocyanates and methods for their preparation are given in the Patents U.S. Pat. No. 3,905,929 and U.S. Pat. No. 3,920,598.

Ionic hydrophilic groups are especially anionic groups such as sulfonate, carboxylate and phosphate groups in the form of their alkali metal or ammonium salts and also cationic groups such as ammonium groups, in particular protonated tertiary amino groups or quaternary ammonium groups.

Potentially ionic hydrophilic groups are especially those which can be converted into the abovementioned ionic hydrophilic groups by simple neutralization, hydrolysis or quaternization reactions, for example carboxyl groups, anhydride groups or tertiary amino groups.

(Potentially) ionic monomers (d) are comphrehensively described, for example, in Ullmanns Encyklopädie der technischen Chemie, 4th edition, Volume 19, pp. 311–313 and, for example, in DE-A 1 495 745.

(Potentially) cationic monomers (d) of particular practical importance are especially monomers containing tertiary amino groups, for example: tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, where the alkyl radicals and alkanediyl units of these tertiary amines comprise, independently of one another, from 2 to 6 carbon atoms. Other suitable compounds are polyethers containing tertiary nitrogen atoms and preferably having two terminal hydroxyl groups, as are obtainable in a manner known per se by, for example, alkoxylation of amines having 2 hydrogen atoms bonded to amine nitrogen, eg. methylamine, aniline or N,N'-dimethylhydrazine. Such polyethers generally have a molecular weight of from 500 to 6000 g/mol.

These tertiary amines are converted into the ammonium salts either by means of acids, preferably strong mineral acids such as phosphoric acid, sulfuric acid or hydrohalic acids or by reaction with suitable quaternizing agents such as $C_1$–$C_6$-alkyl halides, eg. bromides or chlorides.

Suitable monomers containing (potentially) anionic groups are usually aliphatic, cycloaliphatic, araliphatic or aromatic monohydroxycarboxylic and dihydroxycarboxylic acids which bear at least one alcoholic hydroxyl group or a primary or secondary amino group. Preference is given to dihydroxyalkylcarboxylic acids, especially those having from 3 to 10 carbon atoms, as are also described in U.S. Pat. No. 3,412,054. Particular preference is given to compounds of the general formula

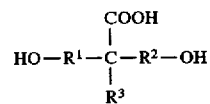

where $R^1$ and $R^2$ are each a $C_1$–$C_4$-alkanediyl unit and $R^3$ is a $C_1$–$C_4$-alkyl unit, especially dimethylolpropionic acid (DMPA).

Also suitable are corresponding dihydroxysulfonic acids and dihydroxyphosphonic acids such as 2,3-dihydroxypropanephosphonic acid.

Other suitable compounds are dihydroxyl compounds having a molecular weight from above 500 to 10,000 g/mol and containing at least 2 carboxylate groups, as are known from DE-A 3 911 827. They are obtainable by reacting dihydroxyl compounds with tetracarboxylic dianhydrides such as pyromellitic dianhydride or cyclopentanetetracarboxylic dianhydride in a molar ratio of from 2:1 to 1.05:1 in a polyaddition reaction. Particularly suitable dihydroxyl compounds are the monomers (b2) mentioned as chain extenders and also the diols (b1).

Suitable monomers (d) containing amino groups reactive toward isocyanates are aminocarboxylic acids such as lysine, β-alanine, the adducts of aliphatic diprimary diamines with α,β-unsaturated carboxylic acids mentioned in DE-A 20 34 479, eg. N-(2-aminoethyl)-2-aminoethanecarboxylic acid, and also the corresponding N-aminoalkylaminoalkylcarboxylic acids, with the alkanediyl units comprising from 2 to 6 carbon atoms.

If monomers containing potentially ionic groups are used, they can be converted into the ionic form before, during, but preferably after the isocyanate polyaddition, since the ionic monomers are frequently only sparingly soluble in the reaction mixture. The carboxylate groups are particularly preferably in the form of their salts with an alkali metal ion or an ammonium ion as counter-ion.

Those skilled in the art of polyurethane chemistry generally know how the molecular weight of the polyurethanes can be set by selection of the proportions of monomers which are reactive toward one another and also selection of the arithmetic mean of the number of reactive functional groups per molecule.

The components (a), (b), (c) and (d) and also their respective molar amounts are normally selected in such a way that the ratio A:B, where A) is the molar amount of isocyanate groups and B) is the sum of the molar amount of the hydroxyl groups and the molar amount of the functional groups which can react with isocyanates in an addition reaction, is from 0.5:1 to 2:1, preferably from 0.8:1 to 1.5:1, particularly preferably from 0.9:1 to 1.2:1. Very particularly preferably, the ratio A:B is very close to 1:1.

In addition to the components (a), (b), (c) and (d), use is made of monomers having only one reactive group, generally in amounts of up to 15 mol %, preferably up to 8 mol %, based on the total amount of the components (a), (b), (c) and (d).

The reaction of the components (a) to (d) is generally carried out at from 20° to 180° C., preferably from 50° to 150° C., under atmospheric pressure.

The reaction times required can extend from a few minutes to a number of hours. Those skilled in the art of polyurethane chemistry know how the reaction time is influenced by many parameters such as temperature, concentration of the monomers and reactivity of the monomers.

To accelerate the reaction of the diisocyanates, it is possible to use the customary catalysts such as dibutyltin dilaurate, tin(II) octoate or diazabicyclo[2.2.2]octane.

As polymerization apparatuses, stirred reactors are useful particularly when solvents are used to ensure a low viscosity and good heat dissipation.

If the reaction is carried out in bulk, extruders, in particular self-cleaning multiscrew extruders, are particularly useful owing to the usually high viscosities and the usually short reaction times.

The dispersions are usually produced by one of the following methods: In the "acetone process", an anionic polyurethane is prepared from the components (a) to (d) in a water-miscible solvent boiling at below 100° C. at atmospheric pressure. Sufficient water is added to form a dispersion in which the water is the coherent phase. The solvent is subsequently distilled off.

The "prepolymer mixing process" differs from the acetone process in that a prepolymer bearing isocyanate groups is first prepared instead of a fully reacted (potentially) anionic polyurethane. The components (a) to (d) are here selected in such a way that the defined ratio (A:B) is from greater than 1.0 to 3, preferably from 1.05 to 1.5. The prepolymer is first dispersed in water and subsequently crosslinked by reaction of the isocyanate groups with amines bearing more than 2 amino groups which are reactive toward isocyanates, or is chain-extended using amines bearing 2 amino groups which are reactive toward isocyanates. Chain extension also takes place when no amine is used. In this case, isocyanate groups are hydrolyzed to form amine groups which react with remaining isocyanate groups of the prepolymers to extend the chains.

Hydrophobic auxiliaries which may sometimes be difficult to disperse homogeneously in the finished dispersion, for example phenol condensation resins made from aldehydes and phenol or phenol derivatives or epoxy resins and further polymers mentioned, for example, in DE-A 39 03 538, 43 09 079 and 40 24 567, which are, for example, used as adhesion promoters in polyurethane dispersions, can be added before the dispersion procedure to the polyurethane or the prepolymer using methods described in the two above-mentioned documents. The hydrophobic auxiliaries mentioned in DE-A 39 03 538, 40 24 567 and 43 09 079 are hereby fully incorporated by reference.

The polyurethane dispersions can contain commercial auxiliaries and additives such as blowing agents, antifoams, emulsifiers, thickeners and thixotropes, colorants such as dyes and pigments.

The packaging film can be used for packaging articles by heating parts of the packaging film to a temperature above the melting point of the polyurethane and simultaneously or up to 10 minutes after cooling the packaging film pressing these parts onto one another, onto other parts of the packaging film or onto another substrate, eg. paper or cardboard, in such a way that the goods to be packed are enclosed.

The packaging film of the present invention is particularly suitable for packaging articles which are usually tightly sealed in bags or pouches, for example foodstuffs, in particular temperature-sensitive sweets such as chocolate bars or icecream bars.

The articles are preferably packed in such a way that they cannot be removed from the packaging without destroying the film.

In packaging these articles, it is possible, for example, to

AI) enclose the article in the packaging film of the present invention by, for example, rolling it into the packaging film, folding the packaging film around it or placing it in a pouch produced from the packaging film and then AII) thermoactivate parts of the packaging film by heating them to a temperature above the melting point of the polyurethane, and AIII) simultaneously or within 10 minutes, preferably within 2 minutes, of cooling to a temperature below the melting point of the polyurethane, press the thermoactivated parts onto one another or onto other parts of the packaging film, with the polyurethane coatings being brought into contact with one another.

For the thermoactivation (step AII), a part of the packaging film is preferably heated to a temperature which is from 10° to 30° C. above the melting point of the polyurethane.

To seal the packaging film (step AIII), the procedure is advantageously to press together the two parts of the packaging film to be sealed using a pressure of from 0.2 to 7 bar.

The way in which the individual process steps are carried out is generally known and can be found, for example, in the book "Verpacken mit Kunststoffen", Carl Hauser Verlag, Munich 1974.

The packaging films are well suited, for example, to producing pouches. In the packaging industry, the procedure is frequently to wind off the packaging film which is procured in the form of rolls, to cut it, if desired, into smaller strips and to combine these strips to form a tube. At the point at which the sides of the strips overlap, the packaging films are sealed by application of pressure and heat, so as to form a tube having an exterior fold. The tube is subsequently sealed at a certain distance from its end at right angles to the strip of film so as to produce an open pouch. In the next process step, the pouch is filled. The opening of the pouch is then sealed and the filled and closed pouch is cut from the remainder of the tube of film, after which a new pouch is produced by sealing at right angles to the strip of film, and the further process steps are repeated.

The packaging films of the present invention offer the advantage that the sealing and production of the pouches can be carried out at comparatively low temperatures, so that the goods being packed are exposed to a lesser degree to the heat given off from the sealing equipment. In addition, the sealing seams can withstand mechanical stresses only a short time after removal of the sealing equipment, so that the pouches can be filled immediately after they are produced. This allows the achievement of short cycle times in the packaging process, which improves its economics.

If it should be necessary to reduce the thermal stressing still further, a particularly suitable procedure is the following packaging process, in which BI) parts of a packaging film as claimed thermoactivated by heating them to a temperature above the melting point of the polyurethane, then BII) the thermoactivated parts of the packaging film are cooled to a temperature below the melting point of the polyurethane, then BIII) within 10 minutes, preferably within 2 minutes, of carrying out the step (BII), an article is enclosed in the packaging film and then BIV) within 10 minutes, preferably within 2 minutes, of carrying out the step (BII), the thermoactivated parts are pressed onto one another or onto other parts of the packaging film, preferably at a pressure of from 0.2 to 7 bar, in such a way that the polyurethane coatings come into contact with one another.

Spatial separation of the process step in which the packaging films are converted into the sealable state from the actual packaging procedure, which is possible in this process, can prevent thermal damage to the goods being packed.

It has been found that the packaging films are blocking-resistant at temperatures below the melting point of the polyurethane, ie. the film surfaces can be brought into contact with one another without them adhering to one another. This property is of great importance for simple transport and processing of the packaging films.

The advantageous processing properties of the packaging films are presumably attributable to the fact that the polyurethane does not recrystallize immediately when it is cooled again after heating to above its melting point, but remains in the amorphous state in which it is adhesive for a few further minutes.

EXAMPLES

The melting point and the enthalpy of fusion were measured in the following way:

The measurement was carried out on polyurethane films having a thickness of 200 μm which prior to the measurement were dried at 40° C. for 72 hours in a convection drying oven. To prepare for the measurement, about 13 mg of the polyurethane were placed in dishes which are usually used as sample containers for measurements in DSC instruments (differential scanning calorimetry). The dishes were closed, the samples were first heated to 120° C., cooled at 20 K/min and maintained at 20° C. for 20 hours. The samples thus prepared were measured by the DSC method in accordance with DIN 53765, with the sample being heated at 20 K/min.

The melting point was taken as the peak temperature $T_{SP}$ in accordance with DIN 53765. The enthalpy of fusion was determined as in FIG. 4 of DIN 53765.

The melting points and enthalpies of fusion of the diols b.1.1 used were measured in a similar manner.

PREPARATIVE EXAMPLES

The viscosities of the dispersions were measured at 20° C. at a shear rate of 250 s$^{-1}$ using a rotational rheometer with concentric cylinders (spindle diameter: 38.7 mm, beaker diameter: 42.0 mm).

The particle size of the latex particles was determined indirectly by turbidity measurements. For this purpose, the turbidity of a dispersion having a solids content of 0.01% by weight was determined relative to distilled water at a path length of 2.5 cm and at room temperature.

$$LD = \frac{\text{Intensity}_{dispersion} \times 100}{\text{Intensity}_{water}}$$

The symbols used in the following examples have the meanings given below:

Example 1

| Initial charge | | |
|---|---|---|
| 722.9 g | 0.3 mol | Polyester from ADA and 1,4-butanediol, OHN = 46.7 Melting point: 55° C. Enthalpy of fusion: 85 J/g |
| 1.25 g | | DBTL |
| 191 g | | Acetone |
| Feed stream 1 | | |
| 30.9 g | 0.18 mol | TDI |
| Feed stream 2 | | |
| 29.9 g | 0.18 mol | HDI |
| Feed stream 3 | | |
| 766 g | | Acetone |
| Feed stream 4 | | |
| 40.95 | 0.093 mol | PUD salt, 40% strength in water |
| Feed stream 5 | | |
| 1200 g | | DI water |

OHN = hydroxyl number
ADA = adipic acid
B14 = 1,4-butanediol
TDI = toluylene diisocyanate
HDI = hexamethylene diisocyanate
PUD salt = sodium salt of the Michael adduct of acrylic acid and ethylenediamine
DBTL = dibutyltin dilaurate
DMPA = dimethylolpropionic acid
DI water = deionized water The initial charge is heated to 60° C. and feed stream 1 is added. After 1 hour at 60° C., feed stream 2 is added and the mixture is maintained at 60° C. for a further 45 minutes. It is then cooled to 55° C. and diluted with feed stream 3. The NCO content is now 0.49%. The polyurethane is chain-extended using feed stream 4 and dispersed using feed stream 5. The acetone is distilled off under reduced pressure at 100 mbar and an internal temperature of 43° C. using a commercial antifoam. After adjusting the solids content to 40%, the dispersion has the following analytical values: LD: 90 viscosity: 67 mPas pH: 8.3

Example 2

| Initial charge | | |
|---|---|---|
| 614.6 g | 0.29 mol | Polyester from ADA and 1,6-hexanediol, OHN = 53.1 |
| 0.5 g | | DBTL |
| 16.1 g | 0.12 mol | DMPA |
| 26.21 g | 0.29 mol | 1,4-Butanediol |
| 195 g | | Acetone |
| Feed stream 1 | | |
| 143.1 g | 0.82 mol | TDI |
| Feed stream 2 | | |
| 782 g | | Acetone |
| Feed stream 3 | 0.12 mol | |
| 4.2 g | | NaOH in 20 g of DI water |
| Feed stream 4 | | |
| 1200 g | | DI water |

The initial charge is heated to 65° C. and feed stream 1 is added. The mixture is maintained at 70° C. for 4 hours, then diluted with feed stream 2 and cooled to 55° C. The NCO content is 0.53%. Feed stream 3 is added quickly and the polyurethane is dispersed after 2 minutes using feed stream 4. Distillation as in Example 1. Solids content: 40% LD: 47 viscosity: 17 mPas pH: 7.7

Example 3

| Initial charge | | |
|---|---|---|
| 608 g | 0.3 mol | Polyester from ADA and ethylene glycol OHN = 56 Melting point: 50.5° C. Enthalpy of fusion: 85 J/g |
| 0.5 g | | DBTL |
| 16.1 g | 0.12 mol | DMPA |
| 27.38 g | 0.3 mol | 1,4-Butanediol |
| 195 g | | Acetone |
| Feed stream 1 | | |
| 147.8 g | 0.848 mol | TDI |
| Feed stream 2 | | |
| 782 g | | Acetone |
| Feed stream 3 | | |
| 4.2 g | 0.12 mol | NaOH in 20 g of DI water |
| Feed stream 4 | | |
| 1200 g | | DI water |

Procedure as in Example 2, the NCO content after feed stream 2 is here 0.61%. Solids content: 40% LD: 11.3 viscosity: 8.9 mPas pH: 7.7

Example 4

| Initial charge | | |
|---|---|---|
| 714.3 g | 0.356 mol | Polyester from ADA, 1,4-butanediol and 1,6-hexanediol 2:1, OHN = 56 Melting point: 45° C. Enthalpy of fusion: 100 J/g |
| 0.5 g | | DBTL |
| 191 g | | Acetone |
| Feed stream 1 | | |
| 35.3 g | 0.203 mol | TDI |
| Feed stream 2 | | |
| 34.1 g | 0.203 mol | HDI |
| Feed stream 3 | | |
| 766 g | | Acetone |
| Feed stream 4 | | |
| 40.95 g | 0.93 mol | PUD salt, 40% strength in water |
| Feed stream 5 | | |
| 1200 g | | DI water |

Procedure as in Example 1, after feed stream 2 the temperature is maintained at 65° C. for 30 minutes. The NCO content after feed stream 3 is 0.57%. Solids content: 40% LD: 95 viscosity: 84 mPas pH: 7.7.

Comparative Example 1

| Initial charge | | |
|---|---|---|
| 540.8 g | 0.24 mol | Polypropylene oxide diol, OHN = 50.5 |
| 0.5 g | | DBTL |
| 25.8 g | 0.19 mol | DMPA |
| 50.7 g | 0.487 mol | Neopentyl glycol |
| Feed stream 1 | | |
| 182.7 g | 1.05 mol | TDI |
| Feed stream 2 | | |

| -continued | | |
|---|---|---|
| 978 g | | Acetone |
| Feed stream 3 | | |
| 6.15 g | 0.154 mol | NaOH in 20 g of DI water |
| Feed stream 4 | | |
| 1200 g | | DI water |

The initial charge is heated to 80° C. and feed stream 1 is added. The mixture is then heated at 110° C. for 2 hours. It is then carefully diluted with feed stream 2 and in the process cooled to 55° C. The NCO content is 0.49%. The mixture is neutralized using feed stream 3 and dispersed with water. Distillation is carried out using a commercial antifoam and viscosity regulator. Solids content: 40% LD: 91 viscosity: 203 mPas pH: 8.2

Comparative Example 2

| Initial charge | | |
|---|---|---|
| 670.3 g | 0.35 mol | Polyester from ADA, neopentyl glycol and 1,6-hexanediol, OHN = 58.1 Ratio of hexanediol:neopentyl glycol 2.3:1 Melting point: 24.6° C. (main peak) Enthalpy of fusion: 49 J/g |
| 0.5 g | | DBTL |
| 21.5 g | 0.16 mol | DMPA |
| 195 g | | Acetone |
| Feed stream 1 | | |
| 108.2 g | 0.62 mol | TDI |
| Feed stream 2 | | |
| 782 g | | Acetone |
| Feed stream 3 | | |
| 5.13 g | 0.128 mol | NaOH in 20 g of DI water |
| Feed stream 4 | | |
| 1200 g | | DI water |

Procedure as in Example 2. The NCO content after feed stream 2 is 0.75%. Solids content: 40% LD: 79 viscosity: 20 mPas pH: 7.7

Enthalpy of Fusion and Melting Point

| Sample | Enthalpy of fusion [J/g] | Melting point [°C.] |
|---|---|---|
| Example 1 | 61 | 57 |
| Example 2 | 51 | 56.6 |
| Example 3 | 27 | 41.3, 50.3 double peak |
| Example 4 | 62 | 38.6 |
| Comparative Example 1 | <2 | — |
| Comparative Example 2 | <2 | 34.7 |

B. Use examples.
  B.1 Production of the packaging films
  The support films used were oriented polypropylene films (OPP films) which had been coated with a commercial two-component polyurethane primer. Before being coated with the respective polyurethane, the support films were subjected to a corona pretreatment. The support films pretreated in this way were coated uniformly with 4 g/m² of the respective polyurethane dispersion whose solids content was adjusted to 30% by weight. For comparison, 2 further packaging films were coated with a commercial polyacrylate dispersion (Comparative Example 3) and a PVDC dispersion (Comparative Example 4) in place of the polyurethane dispersion.

B.2 Use tests on the packaging film.

I. Blocking behavior

A stack was formed from 10 packaging films, with the films being stacked so that the coatings of pairs of films faced one another. After storage for 6 days under standard conditions of temperature and humidity and under a load of 100 N/cm$^2$, the packaging films were separated manually and assessed according to a scale of grades.

Grade 1. no blocking
Grade 2. slight blocking
Grade 3. moderate blocking
Grade 4. strong blocking II. Heat Sealability The coated samples were sealed with the coatings facing one another for 0.25 seconds at 50° C. using a contact pressure of 2.5 bar. The sealing jaws have the dimensions 150×10 mm, the resulting pressure is 0.25 N/mm$^2$.

The sealed sample is cut into (usually 7) individual test specimens, with each having a width of 15 mm. The strength of the sealing seams (SSS) is measured using a computerized tearing machine at a tearing velocity of 150 mm/min. The tear initiation resistance and the tear propagation resistance in [N] is reported in each case.

III. Cold Sealability

An individual test specimen which has been coated with a dispersion as described in Example 1 and has been prepared as described under Point II, "Heat sealability" is heated at 50° C. for 2 minutes in a drying oven, cooled to room temperature within a few seconds and sealed at room temperature 1 minute after cooling using unheated sealing jaws.

Tear initiation resistance: 3.7N
Tear propagation resistance: 2.8N

|  | Ex. 1 | Ex. 2 | Ex. 3 | Ex. 4 | Comp. Ex. 1 | Comp. Ex. 2 | Comp. Ex. 3 | Comp. Ex. 4 |
| --- | --- | --- | --- | --- | --- | --- | --- | --- |
| Blocking behavior | | | | | | | | |
| Coating/coating | 1 | 1 | 2 | 1 | 4 | 4 | 1 | 1 |
| Coating/reverse side | 1 | 1 | 1 | 2 | 4 | 3 | 1 | 1 |
| Heat sealability | | | | | | | | |
| Tear initiation resistance [N] | 3.1 | 2.9 | 4.2 | 2.0 | 3.2 | 3.2 | NS | NS |
| Tear propagation resistance [N] | 2.5 | 2.4 | 3.2 | 1.9 | 2.0 | 2.6 | NS | NS |

NS = no sealing

We claim:

1. A packaging film which is coated with a polyurethane which bears hydrophilic groups which make the polyurethane water-dispersible and which has a melting point of from 20° to 70° C., with the enthalpy of fusion in this temperature range being at least 20 J/g.

2. A packaging film as claimed in claim 1, wherein the polyurethane is prepared from a) polyfunctional isocyanates having from 4 to 30 carbon atoms, b) diols of which b1) from 10 to 100 mol %, based on the total amount of the diols (b), have a molecular weight of from 500 to 5000, where at least 80% by weight of the diols (b1) are diols (b1.1) having a melting point of from 30° to 100° C. and an enthalpy of fusion in this temperature range of at least 50 J/g and b2) from 0 to 90 mol %, based on the total amount of diols (b), have a molecular weight of from 60 to 500 g/mol, c) if desired, further polyfunctional compounds which are different from the diols (b) and contain reactive groups which are alcoholic hydroxyl groups or primary or secondary amino groups, and d) monomers which are different from the monomers (a), (b) and (c) and contain at least one isocyanate group or at least one group which is reactive toward isocyanate groups, and which also bear at least one hydrophilic group or one potentially hydrophilic group, which makes the polyurethane water-dispersible.

3. A packaging film as claimed in claim 2, wherein the diol (b1.1) is a polyester diol derived from an alcohol HO—(CH$_2$)$_x$—OH, where x is an even number from 2 to 20, and a dicarboxylic acid HOOC—(CH$_2$)$_y$—COOH, where y is an even number from 2 to 20.

4. A packaging film as claimed in claim 2, wherein the monomer (d) is a diol having a molecular weight of from 500 to 10,000 and at least 2 carboxyl groups, obtainable by reacting aliphatic diols with tetracarboxylic dianhydrides in a molar ratio of from 1.05:1 to 2:1.

5. A process for producing packaging films as claimed in claim 1, which comprises coating a support film with an aqueous dispersion comprising a polyurethane which bears hydrophilic groups which make the polyurethane water-dispersible and which has a melting point of from 20° to 70° C., with the enthalpy of fusion in this temperature range being at least 20 J/g.

6. Packaged article obtainable using packaging films as claimed in claim 1.

* * * * *